US006613130B2

(12) United States Patent
Givargis

(10) Patent No.: US 6,613,130 B2
(45) Date of Patent: Sep. 2, 2003

(54) FILTERING SYSTEM FOR REMOVING COMBUSTION GASES FROM AN AIRFLOW

(75) Inventor: John Givargis, Turlock, CA (US)

(73) Assignee: G.E.N. Industries Corp, Los Angeles, CA (US)

(*) Notice: Subject to any disclaimer, the term of this patent is extended or adjusted under 35 U.S.C. 154(b) by 0 days.

(21) Appl. No.: 09/968,145

(22) Filed: Oct. 1, 2001

(65) Prior Publication Data
US 2002/0020159 A1 Feb. 21, 2002

Related U.S. Application Data

(63) Continuation-in-part of application No. 09/907,953, filed on Jul. 18, 2001, which is a continuation of application No. 09/350,566, filed on Jul. 9, 1999, now Pat. No. 6,267,795.

(51) Int. Cl.[7] .......................... B01D 50/00; B01D 47/02; B01D 51/10
(52) U.S. Cl. .......................... 95/287; 95/290; 55/315.2; 55/318; 55/385.3; 55/467.1; 55/486; 55/DIG. 30; 96/337; 96/344; 96/353; 96/364
(58) Field of Search .............................. 55/467.1, 486, 55/315, 385.3, 429, 487, 492, 318, 315.1, 315.2, DIG. 30; 96/337, 342, 343, 344, 351, 352, 353, 364, 361, 386; 95/287, 290

(56) References Cited

U.S. PATENT DOCUMENTS

| 1,853,892 A | | 4/1932 | Boden | |
|---|---|---|---|---|
| 2,612,745 A | * | 10/1952 | Vecchio | ........................ 96/350 |
| 2,940,733 A | * | 6/1960 | Umbricht | ..................... 96/269 |
| 3,299,620 A | | 1/1967 | Hollingworth | |
| 3,556,204 A | | 1/1971 | Dehne | |
| 3,621,652 A | | 11/1971 | Demaree | |
| 3,680,659 A | | 8/1972 | Kasten | |
| 3,732,075 A | | 5/1973 | Acaba | |
| 3,745,939 A | | 7/1973 | Allbritton | |
| 3,831,377 A | * | 8/1974 | Morin | ......................... 60/274 |
| 3,963,416 A | | 6/1976 | Mach | |
| 4,021,194 A | | 5/1977 | Weislehner | |
| 4,110,088 A | * | 8/1978 | Cold et al. | ..................... 95/211 |
| 4,208,381 A | | 6/1980 | Isahaya et al. | |
| 4,295,519 A | | 10/1981 | Bellaff | |
| 4,303,434 A | | 12/1981 | Rough, Sr. et al. | |
| 4,671,807 A | | 6/1987 | Charlton | |
| 4,838,901 A | | 6/1989 | Schmidt et al. | |
| 4,909,309 A | | 3/1990 | Pálfalvi et al. | |
| 5,004,486 A | * | 4/1991 | Chen | .......................... 96/240 |
| 5,074,117 A | | 12/1991 | Kane et al. | |
| 5,145,498 A | | 9/1992 | Houston | |
| 5,215,557 A | | 6/1993 | Johnson et al. | |
| 5,240,487 A | | 8/1993 | Kung | |

(List continued on next page.)

FOREIGN PATENT DOCUMENTS

WO   WO 89/05687   6/1989

Primary Examiner—Robert A. Hopkins
(74) Attorney, Agent, or Firm—Colin P. Abrahams

(57) ABSTRACT

A filter device for removing combustion gases and/or particulate matter from air comprises a cooling unit and filtering unit. The cooling unit has an inlet for receiving an air stream containing combustion gases and/or particulate matter, a cooling member for lowering the temperature of the air stream, a first outlet for discharge of a condensate, and a second outlet for discharge of the air stream containing uncondensed particulate matter. The filtering unit has an inlet for receiving the air stream containing uncondensed particulate matter from the second outlet of the cooling unit, the filtering unit having at least one filter barrier through which the air stream passes, the filter barrier being configured to catch at least a portion of the particulate matter in the air stream. The invention is also for a process for removing combustion gases and/or particulate matter from an air stream.

18 Claims, 7 Drawing Sheets

U.S. PATENT DOCUMENTS

| | | |
|---|---|---|
| 5,280,709 A | 1/1994 | Wang |
| 5,335,492 A | 8/1994 | Zirkel |
| 5,354,362 A | 10/1994 | Sowinski |
| 5,370,067 A * | 12/1994 | Finet .......................... 110/346 |
| 5,370,720 A | 12/1994 | Duncan |
| 5,480,619 A | 1/1996 | Johnson et al. |
| 5,505,752 A | 4/1996 | Burrous et al. |
| 5,512,257 A | 4/1996 | Frey |
| 5,826,518 A | 10/1998 | Bhat et al. |

* cited by examiner

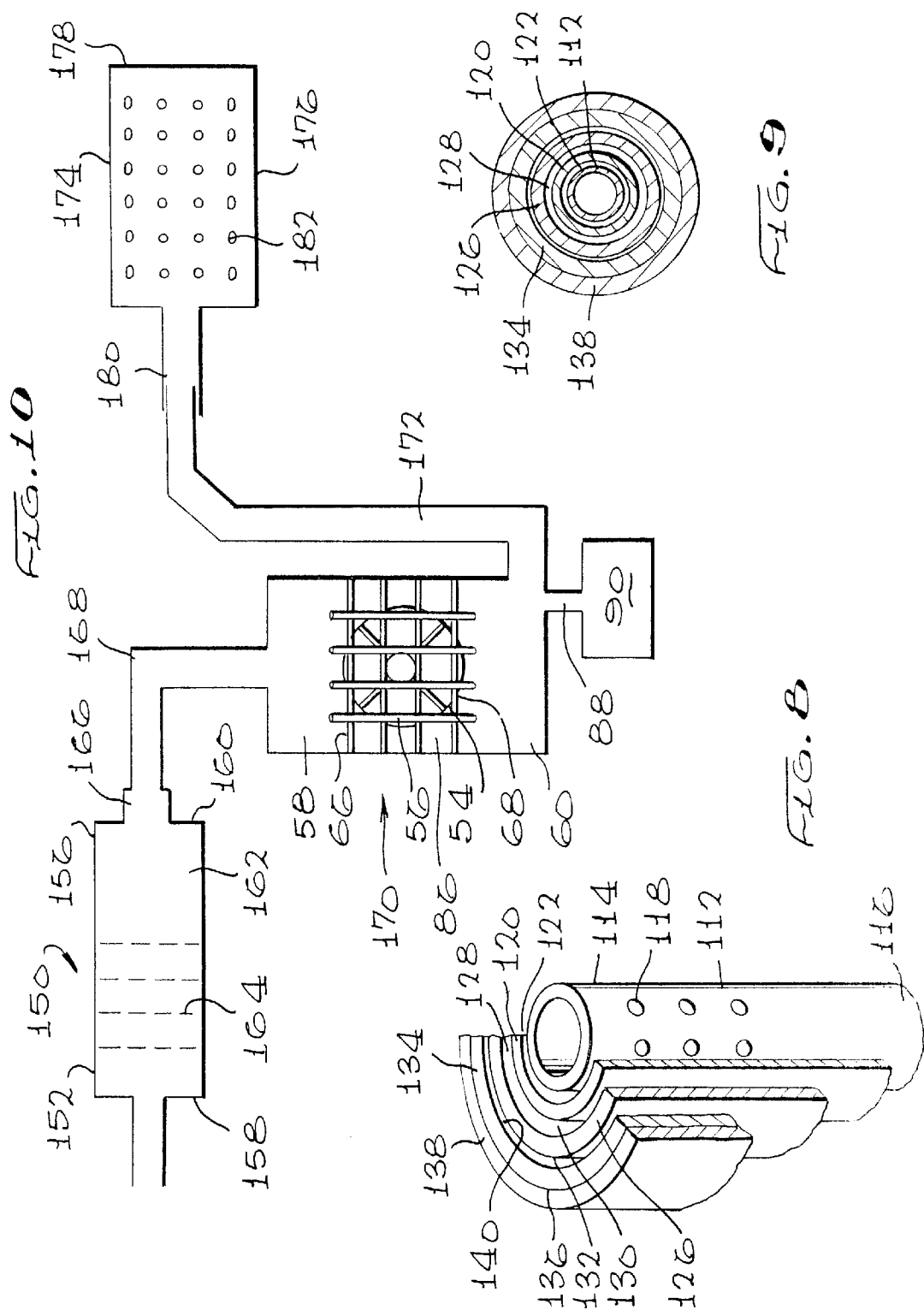

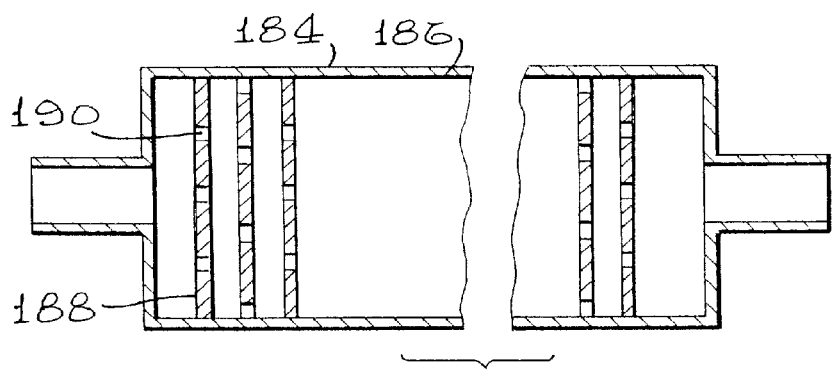
FIG. 11
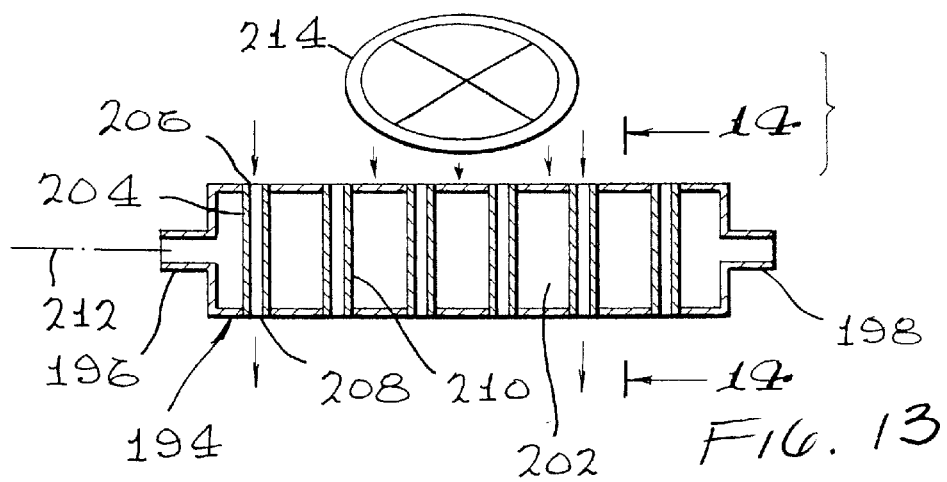
FIG. 12
FIG. 13
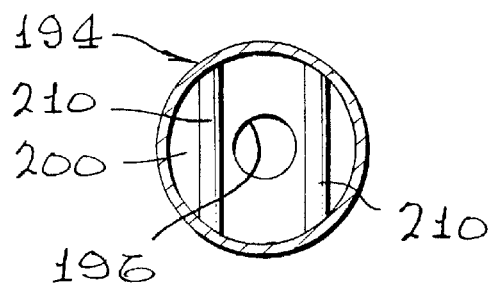
FIG. 14

FILTERING SYSTEM FOR REMOVING COMBUSTION GASES FROM AN AIRFLOW

CROSS REFERENCE TO RELATED APPLICATIONS

This application is a continuation in part application of U.S. Ser. No. 09/907,953 filed Jul. 18, 2001, which is a continuation application of U.S. Ser. No. 09/350,566 filed Jul. 09, 1999, now U.S. Pat. No. 6,267,795. All of these are incorporated herein by reference in their entirety.

FIELD AND BACKGROUND ON THE INVENTION

This invention relates to filtering devices, and particularly to devices for filtering smoke and other combustion materials produced by burning waste products. Such materials are typically comprised of a gas component and a particulate component.

It is well known that the burning of certain waste materials gives rise to a large number of environmental pollutants including noxious gases and solid particulate matter. Not only are many of these by-products of combustion toxic and undesirable for emission into the general atmosphere, but many laws, at the Federal, State and local level, specifically prohibit the discharge of such materials into the air, waterways or other natural outlets. Therefore, it is essential that any polluting materials produced by combustion should be thoroughly and effectively treated so as to extract therefrom noxious gases and particulate matter so that they can be disposed of using environmentally sound and accepted methods.

Many devices and systems have been created to deal with the filtering of gas and particulate emissions depending upon their nature and source. Thus, many plants for the production of consumable products, chemicals and other materials may have associated therewith smoke stacks, the smoke stacks including various treatment and filtering devices for purifying the by-products of combustion prior to discharge into the water or atmosphere. Further, most vehicles, and many machines powered by the use of hydrocarbon fuels, are now fitted with mechanisms specifically designed for reducing the noxious by-products of such fuel combustion. For example, many automotive vehicles have fitted thereto catalytic converters, which contain a catalyst capable of converting potentially polluting exhaust gases into harmless or less harmful products.

There are many examples in the patent literature showing systems for filtering or cleansing combustion materials and particulate matter. U.S. Pat. No. 5,145,498 (Houston) is for a smoke stack exhaust system comprising a water-spray gas-scrubbing device. Waste gases from a building pass into a duct means and thereafter into a scrubbing chamber where they are mixed with water spray. The gas scrubbing water spray removes the particulate materials from the gases. The scrubbing water then passes through a filter tunnel, into a collector tray, through a filter tray and eventually the particulate material is removed from the scrubbing water.

U.S. Pat. No. 4,671,807 (Charlton) teaches a pollution control device for removing a wide variety of particulate matter and gaseous pollutants from the products of combustion. The system comprises a scrubber section, a charcoal filter section, and a dry filter section designed to remove both magnetic and particulate material. The scrubber section uses steam or water, while pipes in the filter section are filled with charcoal material.

U.S. Pat. No. 3,732,075 (Acaba) is for an air pollution control device including both mechanical and chemical filtering of the gases. First, a porous filter material precipitates and traps particulate matter, and, thereafter, a chemical filter reacts with the gases. The apparatus has a housing which includes the mechanical filtering means. Porous cloth-like and other filter material is used to trap various contaminants. The porous filter material may be made in the form of a bag to facilitate disposal of the collected dirt.

U.S. Pat. No. 5,480,619 (Johnson) teaches a combined regenerative scrubber and condensing heat exchanger system including a first heat exchanger for providing an initial cooling of flue gas and a second heat exchanger for further cooling. A spray reagent is introduced into the flue gas and onto the second heat exchanger for removing sulphur dioxide ($SO_2$) from the flue gas and for cleaning the second heat exchanger. A regeneration device is provided to regenerate reagent from the reaction product.

U.S. Pat. No. 3,745,939 (Allbritton) describes effluent cleaner for trash burning and has three essential components, namely, a secondary furnace, a water pit and a stack. The secondary furnace receives a flow stream of effluent from a building, further combusts the materials, and passes the effluent to the water pit. In the water pit, the effluent is subjected to the action of spray nozzles, after which the effluent passes to the stack. Water spray nozzles are located in the stack for washing effluent as it flows upwardly from the water pit.

U.S. Pat. No. 3,299,620 (Hollingworth) discloses a gas treatment device comprising a recirculating pump which withdraws liquid from a reservoir and circulates it to spray chamber. A filter is provided and includes a low velocity simple dust, dirt and other common filter medium. There is also a filter which is of an electrostatic type, which supplements the action of the first filter. Thus, solids which may have passed through the first filter will hopefully be entrapped by the electrostatic type filter. A further absorbent-type filter is provided to remove certain compounds or gases. Above the chamber, there is an eliminator section for trapping moisture particles. Above the eliminator, another filter pack containing a series of filters is provided to remove pollutant gases, gaseous contaminants and the like.

U.S. Pat. No. 5,215,557 (Johnson) teaches a dry scrubber with integral particulate collection devices. The invention places a dry scrubber/particulate collection device in a single unit, and combines both operations. The invention shows a baghouse around the base of a chimney stack. Flue gas enters the baghouse where particulate material would be removed before proceeding to the stack. The removal of other contaminants, such as sulphur oxide, takes place at some other location before flue gas enters the baghouse. Johnson also describes a dry scrubber integrated with a particulate collection device. Hot flue gas enters the dry scrubber and is directed to a spray zone where mixing of the flue gas with sprayed droplets of an atomized alkaline solution takes place. In this way, sulphur oxide and other contaminants may be absorbed. The flue gas then passes through dampers to a particulate collection device, and thereafter through fabric filters of a baghouse.

Other patents/patent applications showing different forms of filtering systems include: U.S. Pat. Nos. 5,286,518; 5,512,257; 5,370,720; 4,208,381; and International Application No.

Unlike any of the various filtering systems shown in the prior art, the present invention is for a two-stage system whereby, for example, smoke produced by the combustion of waste materials is subjected to a two-stage treatment. In the first stage, the smoke effluent containing a gas component and a particulate matter component is cooled to condense at least some of the various gases contained therein, and the condensed moisture is removed for disposal. In the second stage, the material remaining after cooling is subjected to a rigorous physical filtering system where dry particulate matter is extracted.

SUMMARY OF THE INVENTION

According to one aspect of the invention, there is provided a filter device for removing combustion gases and/or particulate matter from air, the device comprising: a cooling unit having an inlet for receiving an air stream containing combustion gases and/or particulate matter, a cooling member for lowering the temperature of the air stream, a first outlet for discharge of a condensate, and a second outlet for discharge of the air stream containing uncondensed particulate matter; and a filtering unit having an inlet for receiving the air stream containing uncondensed particulate matter from the second outlet of the cooling unit, the filtering unit having at least one filter barrier through which the air stream passes, the filter barrier being configured to catch at least a portion of the particulate matter in the air stream. Preferably, there is provided a second filtering unit having an inlet for receiving the air stream from the first filtering unit, the second filtering unit comprising a liquid through which the air stream is passed to reduce or eliminate at least a portion of the remaining particulate matter in the air stream.

According to another aspect of the invention, there is provided a process for removing combustion gases and/or particulate matter from an air stream, the process comprising: cooling the air stream in a cooling unit to produce a condensate component containing at least some condensed combustion gases and an uncondensed component containing at least some of the particulate matter; discharging the condensate component from the cooling unit into a receptacle; conveying the uncondensed component from the cooling unit to a filtering unit downstream thereof; and forcing the uncondensed component through a filter to capture at least some of the particulate matter therein.

The invention thus provides a filtering device, system and method whereby the products of combustion are treated so as to extract therefrom at least some of the noxious gases and particulate matter contained therein. The apparatus and system of the invention preferably is for a two-stage operation, namely, a first stage of cooling and condensation of gases and subsequent removal thereof, and a second stage involving the physical filtering of any particulate matter remaining in the emission.

The system and method of the invention are suitable for extracting undesirable components of emissions produced by the combustion of a large number of varying products, including but not limited to plastics, tires, oil, wood, synthetic materials and/or diesel. The invention may comprise a system and method of extracting undesirable gases which is directly associated with or connected to a combustion chamber wherein waste materials are burned, and the smoke and combustible gases produced thereby treated by the system of the invention. In another form, the invention may comprise a system and method attached to buildings and other structures, the system being capable of extracting air from within the structure and subjecting it to the process to extract the noxious gases and/or particulate matter. In this latter situation, the system and device of the invention may, for example, be used in association with factories, workshops or other industrial plants where by-products of combustion are produced and need to be extracted from the atmosphere. In another example, the system and method of the invention may be used in houses or hotels, and operate in response to sensors which detect the presence of smoke. In such a situation, a vacuum air extractor may be triggered to suck air out of, for example, a hotel room and subject the air to the two-stage treatment process for removing gases and particulate matter therefrom.

In short, therefore, the invention essentially takes smoke produced either by combustion in an industrial plant, or produced by fire in a residential or hotel setting, whereby the smoke is channeled through the system of the invention to purify or at least partly purify the contaminated air.

The filtering device of the invention comprises a cooling device through which the smoke or emission is forced such that the cooling produces a condensation of at least several of the gases contained in the smoke. The condensate is separated from the remainder of the smoke, and directed to a reservoir where it is collected and subsequently disposed of using environmentally acceptable techniques. The remainder of the gases are then passed through a series of increasingly fine filters or meshes, preferably with sufficient force so that the particulate matter may be further broken down. The air, with particulate matter removed, is then able to exit the system, while the particulate matter is collected within the filters in containers that permit subsequent removal and disposal in a way which is not harmful to the environment.

The cooling system of the invention is preferably an air cooled system where the smoke is forced through a series of conduits subjected to fan cooling.

BRIEF DESCRIPTION OF THE DRAWINGS

FIG. 8 is a cut-away perspective view showing the layers of filters in the filtering unit of the invention;

FIG. 9 is a top view of the filtering unit shown in FIG. 8;

FIG. 10 is a schematic representation of a second embodiment of the filtering system of the invention when used in association with a vehicle or other engine producing polluting emissions;

FIG. 11 is a schematic cross-section through a muffler system showing one embodiment of the invention;

FIG. 12 is a side view of another muffler system which may be used as part of the present invention;

FIG. 13 is a cross-section through the lines 13—13 shown in FIG. 12; and

FIG. 14 is a cross-section through lines 14—14 of the muffler system shown in FIG. 13;

DETAILED DESCRIPTION OF THE PREFERRED EMBODIMENTS

Reference is now made to the drawings accompanying this application which show various embodiments and details relating to the filtering system of the invention.

Figure 1:
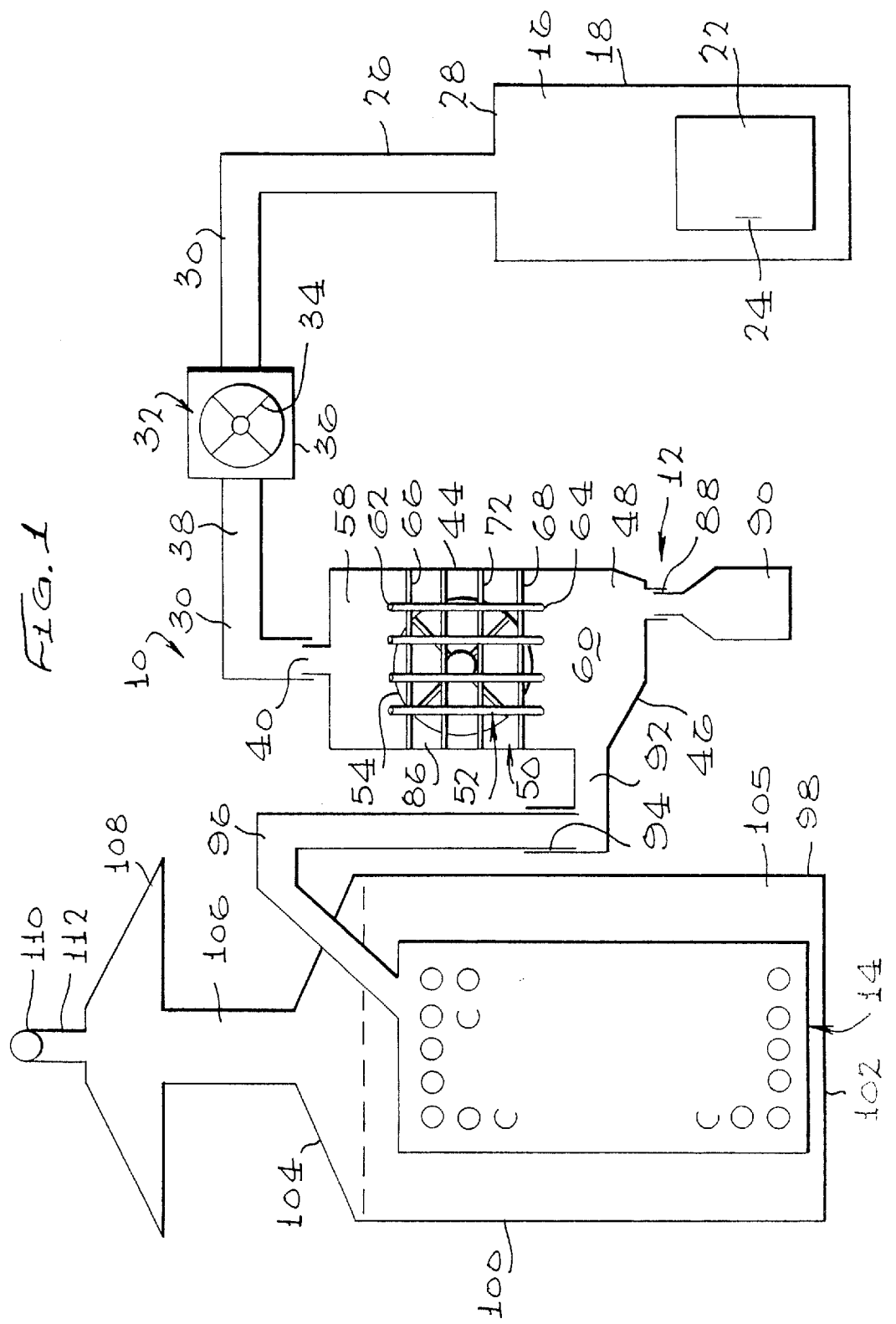
FIG. 1 is a schematic illustration showing a first embodiment of the filtering system of the invention.

With particular reference to FIG. 1, there is shown in schematic form the various components which constitute the filtering system of the invention. In FIG. 1, there is shown a filtering system designated by the numeral 10, comprising a cooling unit 12 connected to a filtering unit 14. In the particular embodiment shown in FIG. 1, the cooling unit 12 communicates with a combustion chamber 16 where combustion of waste products takes place. Such waste products may comprise wood, plastics, oil, diesel, or any other natural or synthetic product which can be burned. It should be appreciated, however, that the cooling unit 12 can be connected to other sources as well. For example, the cooling unit can be used when connected to housing structures, industrial plants, or hotel rooms, so that any smoke or combusted materials produced within these housings/structures can be extracted at the appropriate time, and conveyed to the cooling unit 12, as will be described in further detail below.

The combustion chamber 16 is defined by a combustion housing 18 defining a space 20 in which the waste products, as mentioned above, are placed. These waste products are introduced into the combustion chamber 16 through a door 22 having a lock and handle 24. Upon combustion of the waste materials, smoke and gases are produced, and these exit the combustion chamber 16 through a flue 26 which extends outwardly from the upper wall 28 of the combustion chamber 16. The flue 26 connects to a conduit 30, the conduit 30 including an in-line vacuum extractor 32. The vacuum extractor 32 comprises a fan 34 located within a fan housing 36 so that, when connected and operative, the fan 34 creates a negative pressure within the conduit 30 and flue 26 to draw or extract the smoke produced by combustion.

The smoke passing through the conduit 30 and generally designated by the numeral 38 is conveyed to the cooling unit 12, passing through the entry port 40. The entry port 40 extends outwardly from an upper wall 42 of the cooling unit 12. In addition to the upper wall 42, the cooling unit 12 has a side wall 44 and a lower wall 46, all of which define a cooler chamber 48 in which cooling of the hot smoke 38 from the combustion chamber 16 takes place.

The cooling of the smoke takes place by the action of a radiator type structure 50 which essentially comprises a smoke conduit portion 52 and a fan unit 54. The smoke conduit portion 52 comprises a series of parallel vertical pipes 56, which are open ended, and provide the only avenue whereby smoke 38 can travel from an upper chamber portion 58 to a lower chamber portion 60. The smoke therefore enters the first end 62 of each vertical pipe 56 and is forced downwardly therethrough to exit at the second end 64 of each pipe, thus being transported from the upper chamber portion 58 to the lower chamber portion 60.

Figure 3:
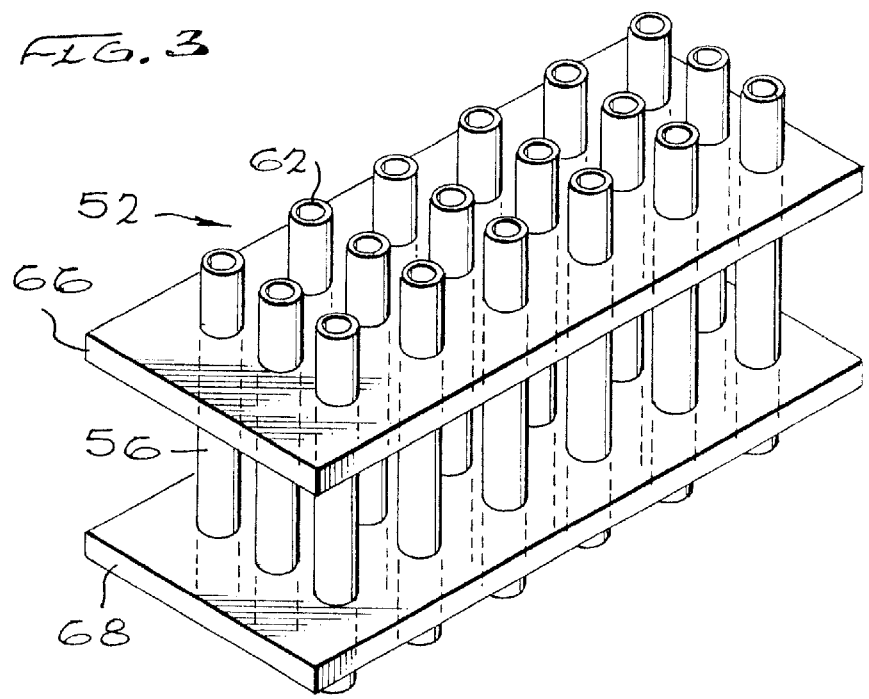
FIG. 3 is a perspective view of a portion of the cooling unit shown in FIG. 2.
Figure 4:
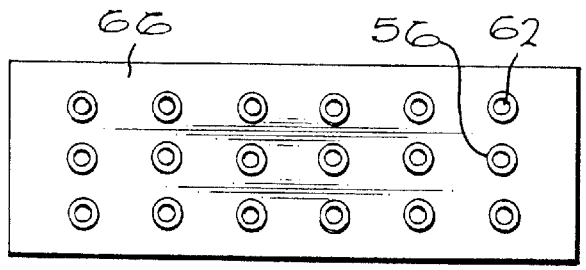
FIG. 4 is a top view of the portion shown in FIG. 3.
Figure 5:
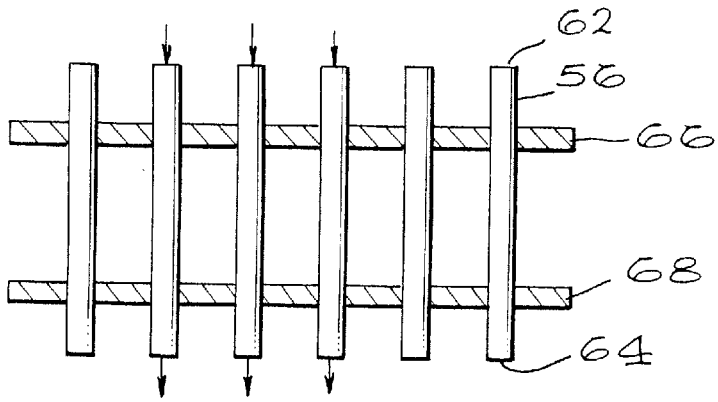
FIG. 5 is a front sectional view of the portion shown in FIG. 3.

The vertical pipes 56 are held in position within the cooler chamber 48 by an upper support tray 66 and a lower support tray 68. FIGS. 3, 4 and 5 best illustrate the smoke conduit portion 52. The upper and lower support trays 66 and 68 respectively each have a plurality of corresponding or registering apertures 70 and in which a vertical pipe 56 is received. Each vertical pipe 56 fits snugly within the aperture 70 so that smoke cannot move past the upper support tray 66 except through the first end 62 of each of the vertical pipes 56. Further, the upper and lower support trays 66 and 68 are firmly connected to the side wall 44 of the cooler housing 12 so that smoke cannot penetrate or move past this join. Seals, welds or O-rings may be provided intermediate each vertical pipe 56 and the upper support tray 66 to enhance the effectiveness of the seal between the pipe 56 and upper support tray 66.

One or more intermediate support trays 72 may be provided to stabilize the smoke conduit portion 52.

Figure 2:
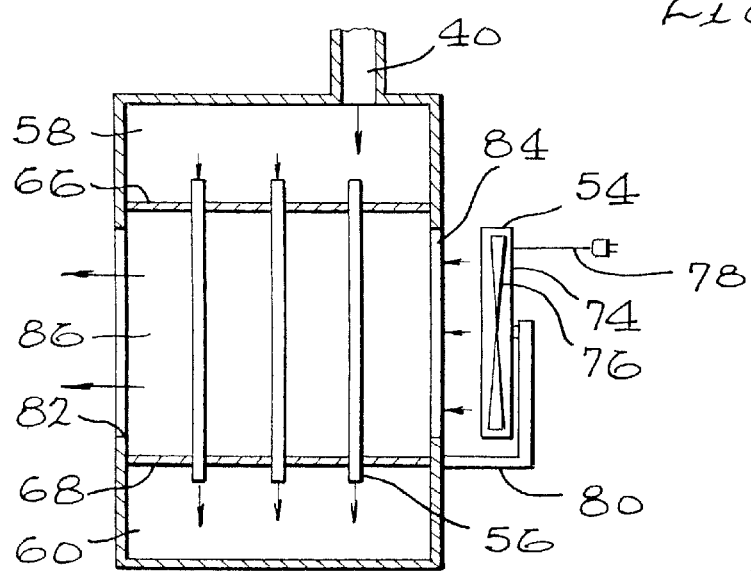
FIG. 2 is a cross-section through the cooling unit of the invention, as shown in FIG. 1.

The fan unit 54, best illustrated in FIG. 2 of the drawings, comprises a fan housing 74 and fan blades 76 mounted therein. The fan unit 54 is connected to an electrical outlet by means of electrical connectors 78 in conventional fashion. The fan unit 54 is preferably attached and properly spaced from the smoke conductor portion 52 by means of a fan unit support bracket 80, shown in FIG. 2 of the drawings. However, the fan unit may also be mounted inside the cooler chamber 48.

As seen in FIG. 2 of the drawings, the fan unit 54 is mounted outside of the cooling unit 12. The side wall 44 of the cooling unit 12 has at least a front opening 82 and a rear opening 84, which provide a path for air produced by the rotation of the blades 76. Upon rotation of the blades 76, air is forced through the rear opening 84, into the central chamber portion 86, and out through the front opening 82. The air passes over the vertical pipes 56, providing a cooling effect for the contents of these pipes 56 as the contents pass therethrough from the upper chamber portion 58 to the lower chamber portion 60.

The lower chamber portion 60 of the cooling unit 12 has two outlets. A condensate outlet 88 is provided in the lower wall 46, and attached thereto is a condensate reservoir 90. The condensate reservoir 90 may be releasably attached to or removed from the condensate outlet 88 so that the contents of the condensate reservoir 90, as will be described more fully below, can be disposed of.

The lower chamber portion 60 also has an outlet for non-condensed materials, indicated by reference numeral 92. The outlet 92 terminates with a connector end 94, which attaches to a filter unit conduit 96. The filter unit conduit 96 connects the outlet 92 with the filter unit 14.

The filter unit 14 is located in a cylindrical-shaped filter unit housing 98 comprising side walls 100, a housing floor 102, and a top wall 104. These components of the filter unit housing define a filter unit chamber 105 in which the filter unit 14 is located.

The filter unit housing 98 has projecting from the top wall 104 a filtered air exit tube 106, surrounded by an optional hood 108. The exit tube 106 has at its end a safety valve 110, and filtered air passes out of the system through an end 112 of the exit tube 106.

Figure 7:
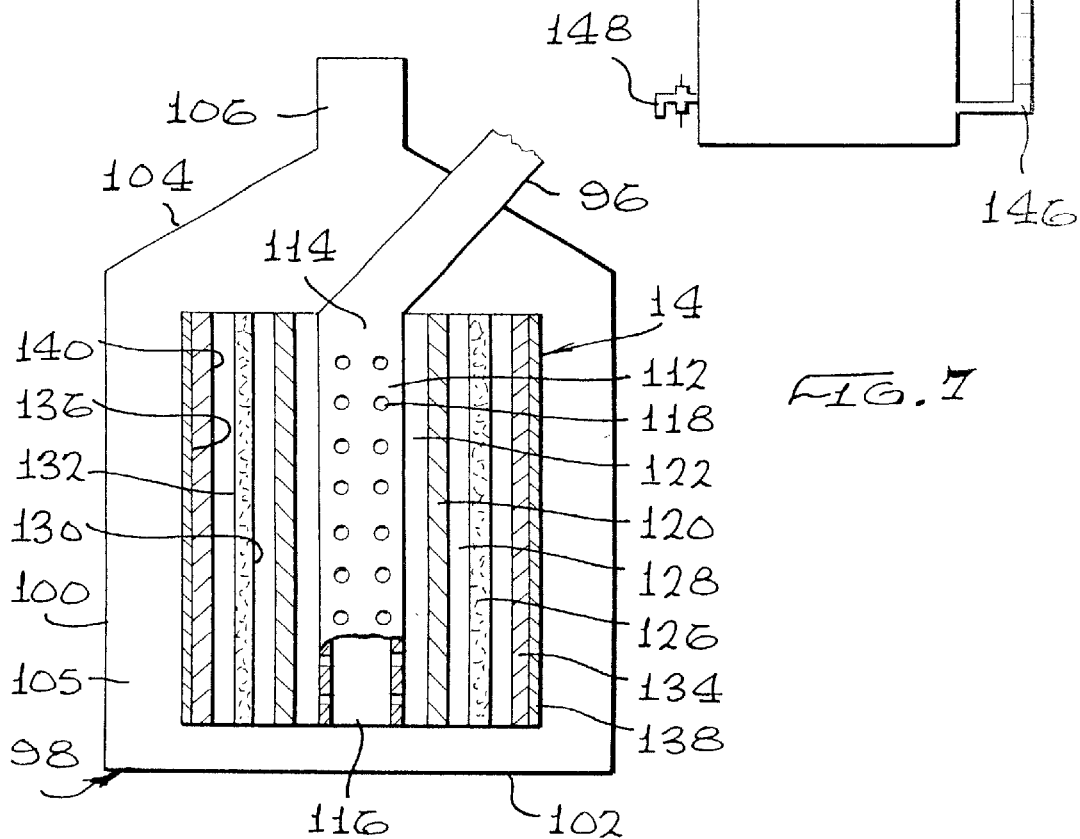
FIG. 7 is a schematic section through the filtering unit of the system shown in FIG. 1.

Specific reference is now made to the filter unit 14, the various components of which are best illustrated in FIGS. 7, 8 and 9 of the drawings. As will be noted from these Figures, the filter unit comprises a series of concentric structures of varying configuration and porosity through which air delivered from the cooling unit 12 through the filter unit conduit 96. The filter unit 14 has as its primary function the removal of particulate matter contained in air delivered from the cooling unit 12, so that the filtered air emerging through the exit tube 106 is substantially free of all but extremely small particles. The filter unit 14 is designed not only to provide an obstacle to the particulates in the air, but also to subject the air passing therethrough to different forces and turbulence to break down larger particulate matter into smaller pieces.

At the center of the filtering unit 14, there is an elongate pipe 112 having an upper end 114 which is open, and a lower end 116 which is closed or sealed. The upper end 114 of the pipe 112 is connected to the filter unit conduit 96, and the smoke and ash which is discharged from the cooler unit 12 is directed by the filter unit conduit 96 into the pipe 112. The wall of the pipe 112 has a plurality of holes 118 so that smoke and ash entering the pipe 112 can only exit the pipe 112 through these holes 118.

Arranged concentrically around the pipe 112, and spaced therefrom is a screen 120, preferably comprised of metal, which completely surrounds the pipe 112. An annular space 122 between the pipe 112 and the screen 120 allows the smoke and ash emanating through the holes 118 to fan out somewhat within the space 122 so that some dispersion occurs prior to contact with the screen 120. The screen 120 comprises a mesh of wire, cloth or plastic, somewhat similar in construction to screens used in doorways and windows. The screen 120 has a dual function. First, the screen 120 is able to capture and filter out some of the larger particulates contained within the smoke and ash mixture being discharged through the holes 118 in the pipe 112. Second, and particularly if the smoke and ash mixture from the pipe 112 is delivered more forcefully, the screen 120 presents a porous barrier to the smoke and ash, breaking down larger particles in the mixture. Depending upon the size of these broken down particles, and any other particles emerging from pipe 112, they will either be caught and held by the screen if sufficiently large, or pass through the screen 120 if the size of the particle is smaller than the mesh and can easily pass therethrough. Any particulate matter which is caught by the screen will be held thereby, and most of this will, by the action of gravity, fall down onto the floor 124 of the filter unit 14 for subsequent removal and disposal.

Concentrically arranged about the screen 120 is a cloth material 126. The cloth material 126 is spaced from the screen 120 so as to define an annular space 128. Particulate matter passing through the screen 120 enters the annular space 128 and impacts the cloth material 126. Preferably, the cloth material has a fine porosity, and is able to trap particulate matter within the smoke and ash which is significantly smaller than that trapped by the screen 120. The cloth material 126 is preferably comprised of a synthetic material such as an acrylic fiber, and the cloth material layer 126 has some thickness so that it defines a sponge-like barrier of loosely woven synthetic material to obstruct the particulate matter. The synthetic cloth may be about one inch thick. The cloth material 126 has an inner surface 130 and an outer surface 132 defining the thickness, and the particulate matter may be caught and trapped at any point between the inner and outer surfaces 130 and 132.

Applied to the outer surface 132 of the cloth material 126 is a fibrous paper layer 134. The paper layer 134 has a structure and porosity somewhat akin to vacuum bags used in vacuum cleaners, permitting the passage of air therethrough, but obstructing and holding all but the most microscopic size particles. Providing outside support, and glued to an outer surface 136 of the paper layer 134 is a supportive burlap cloth layer 138. The inner surface 140 of the paper layer 134 is directly adjacent, or may be spaced a small distance from, the cloth material 126, depending on the specific requirements of the situation.

As will be appreciated, the screen 120, cloth material 126 and paper layer 134 present a series of increasingly fine meshed barriers which sequentially trap increasingly fine particulate matter as the smoke and ash passes through the filter unit 14. The different screens and their structures provide significant advantages: the metal screen not only catches larger particles, but may also break some of them up in order to make them of a suitable size for entrapment in one of the other layers. The sequential catching of increasingly fine particulate matter also helps to ensure that an otherwise single filter would not become clogged at an early stage.

The filter unit is also more effective in that the cooling unit in the system to which the smoke and ash is subject has the effect of removing condensate and moisture from the smoke and ash so that the remaining smoke and ash entering the filter unit 14 will be substantially dry or have a low moisture content. The absence or reduction of moisture from the smoke and ash assists in the collection of the particulate matter therein by making the various filters more effective since the dry particles are more likely to drop down off these filters and onto the floor 124 of the filter unit 14.

In a preferred embodiment, the pipe 112 may have a diameter of about three inches, and a height of about 30 inches. Each of the holes 118 are approximately $\frac{1}{8}$ inch in diameter. The screen 120 may have a mesh size of about $\frac{1}{16}$–$\frac{1}{32}$ of an inch, although this may be selectively varied according to the task at hand. The screen thickness may be approximately $\frac{1}{4}$ inch and may be layered. It is preferably spaced from the pipe by about two inches.

The cloth material 126 may be right up against the screen 120, or it may be spaced therefrom. The paper layer 134 is preferably directly applied to the cloth material 126 so that there is no space between them, although in certain embodiments such a space may be created. Lastly, the burlap outer cloth 138 is directly applied to the outer surface 136 of the paper layer 134, with no space therebetween.

Figure 6:
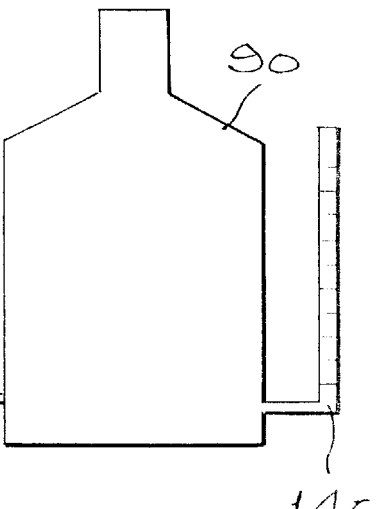
FIG. 6 is a detailed view of the condensate reservoir in one embodiment of the invention.

In the operation of the filtering system 10 of the invention, smoke and ash produced by the combustion of waste materials, or produced by industrial processes, house fires or the like, are sucked through a conduit 30 means of the vacuum extractor 32, and delivered to the cooling unit 12. Within the cooling chamber 48, the smoke and ash is only able to travel through the plurality of vertical pipes 56, entering at the first end 62, and exiting at the second end 64. As the smoke and ash pass through the pipes 56, it is subjected to significant cooling by the fan unit 54 in a radiator type arrangement. The cooling will produce condensate within the pipes 56, the condensate running off and entering the lower chamber portion 60, and flowing out through the condensate outlet 88 into the condensate reservoir 90. The condensate in the reservoir 90 would comprise a plurality of pollutant gases extracted from the smoke and ash by the cooling process, and can be removed when the reservoir 90 is full. As shown in FIG. 6, an embodiment of a reservoir 90 includes a graduated indicator 146 which provides a visible indication of the status of the reservoir 90. In the embodiment shown in FIGS. 6, the reservoir 90 has an outlet tap 148 so that the contents thereof can be removed and disposed of. However, in other embodiments, the entire reservoir 90 may be disconnected from the condensate outlet 88, and disposed of, emptied and/or reused, as desired.

The smoke and ash which has passed from the upper chamber portion 58 to the lower chamber portion 60 through the vertical pipes 56 has a condensed portion which, as described above, is captured within the reservoir 90, and a non-condensed and/or particulate portion which passes through the outlet 92 and is conveyed by the filter unit conduit 96 to the pipe 112 of the filter unit 14. The substantially dry component of the smoke and ash which is conveyed to the pipe 112 passes outwardly through the holes 118 in the pipe. The pipe itself does not serve any filtering function, and does not capture any of the particulate materials contained within the smoke and ash. However, once the smoke and ash have exited the holes 118, they pass through the screen 120, cloth material 126 and paper layer 134, all of which subject the smoke and ash to increasingly refined filtering processes so as to extract from the smoke and ash all but the most minute particles of matter. Therefore, the air which passes through the paper bag and into the filter unit housing 98 has been substantially cleansed and purified of many or all of the pollutant gaseous, liquid and particulate pollutants which are produced by the combustion process.

The air enters into the filter unit chamber 104, moves upwardly through the filtered air exit tube 106, and out through the end 112. As the air passes through the hood 108, it may be subjected to various additional processes, such as the addition of substances which remove and unpleasant smells of the air, or mix the air with fragrances.

The cooler unit 12 shown in the embodiment of FIG. 1 comprises a series of substantially vertical pipes 56. In other embodiments, these pipes may have different shapes: they may be coiled, have up and down components, or be of any other suitable shape and structure. It will be appreciated that pipes which have such shapes would be longer, and would subject the smoke and ash contents thereof to increased exposure time to the cooling process. In turn, this may have the effect of lowering even further the temperature of the hot smoke and gases produced by combustion, and help to condense out therefrom the gaseous components for subsequent collection in the reservoir 90. In the various embodiments shown in FIGS. 1 to 5, a different number of pipes may be provided. The number of pipes, the diameter of the pipes as well as the length thereof can all be varied depending upon the size of the system and the amount of pollutant removal which will take place. Larger systems will, of course, have more vertical pipes, and the length and diameter thereof will be adjusted accordingly. The pipes may be arranged in parallel rows, may be zigzagged, staggered or have any other desired configuration. Further, any appropriate material may be used to make the pipes, such as aluminum and copper. Copper pipes may well be preferred, since they are good conductors of heat, and will facilitate the cooling process by functioning as a heat exchanger between the hot smoke and ash gases within the pipes, and the cooler air fanned about the pipes by the fan unit 54. The arrangement of the pipes, namely, whether in rows, zigzagged, etc., may also be determined by the position of the fan, since the ultimate purpose is of course to expose each one of the pipes maximally to the cooling stream of air produced by the fan.

The trays 66, 68, and 72 offer a seal, brace and support, and may be comprised of steel, aluminum or other suitable material. Since the upper support tray and lower support trays 66 and 68 provide most of the structural support, these will, in use, tend to be stronger than any intermediate trays which may be provided.

Sensors and gauges may also be provided throughout the system, and particularly associated with the reservoir 90 and filter unit 14 to provide visual, audio or other types of signals to alert users to the fact that the system requires removal of liquid and solid matter which has accumulated from the smoke and ash.

The pipes 56 may typically arranged so as to be 18–21 in number, with each pipe being of a diameter approximately ½–¾ inch, with a length of two feet. The fans driving the systems, such as extractor fan 32 and fan unit 54, may be sized and powered depending upon the extent of filtration which the system has to perform.

The various embodiments described above typically show a filter system for use in conjunction with a structure, such as an incinerator of waste material, or for attachment to an industrial plant, hotel, or a residential housing including apartments, town houses or detached homes. However, the system can also be used in conjunction with internal combustion engines, including vehicle engines. Reference is now made to FIG. 10 of the drawings which shows such a system. With reference to FIG. 10, there is shown a filtering system 150 for treating and filtering gas emissions produced by an internal combustion engine, and most particularly for such an engine on a vehicle.

The filter system 150 comprises an adapted muffler 152 having an emission inlet 154 which connects to the internal combustion engine in a conventional fashion. The muffler 152 comprises a side wall 156 and two end walls 158 and 160, all of which define the chamber 162. The chamber 162 contains a series of baffles 164. The emission gases pass through the inlet 154, and into the chamber 162, and are thereafter discharged into the emission outlet 166 whereupon they are conveyed through a conduit 168 to the cooler unit 170. The cooler unit 170 is essentially identical in concept and structure to the cooler unit 12 described with respect to FIG. 1. Therefore, like reference numerals have been used in FIG. 10 to describe equivalent parts. Since the structure and function this cooler unit has already been described, it will be not repeated at this point. It need only be noted that the IC gas emissions enter the cooler unit 170, pass through pipes 56, and undergo cooling during the course of such passage through the pipes 56. The cooling, effected by the fan unit 54 results in the gas emissions being separated into a liquid component which is a condensate of the gases produced by the cooling in the pipes 56, and a gas component. The liquid component is trapped in the reservoir, where it is disposed of from time to time in a manner already described, while the non-condensed gas component passes through the filter conduit 172 to a filter unit 174. The filter unit 174 comprises a galvanized cylindrical tube 176 having end 176, and an entry conduit 180 which is connected to the filter conduit 172. Within the filter unit, there is located a series of filters, such as one or more of the types of filters described with respect to FIG. 1. Thus, the filter unit 174 may include a screen, cloth screen and paper layer through which the gas emissions should pass, and wherein all but the smallest particles contained therein will be trapped. The filter unit 174 has a plurality of small holes 182 in the galvanized cylindrical tube 176, through which the substantially cleansed and purified air can be discharged into the atmosphere.

Variations of the system for use in conjunction with the internal combustion engine are illustrated in FIGS. 11 to 14 of the drawings. With respect to FIG. 11, a muffler 184 defining a chamber 186 is provided, the chamber including a plurality of disc-shaped baffles 188 arranged within the chamber. Each baffle 188 has a plurality of holes 190, and the baffles are arranged in parallel serial order, such that the holes 190 in one baffle do not correspond or register with holes 190 in an adjacent baffle. The effect of the baffles is therefore to reduce the velocity of the gas emission, provide thorough mixing thereof, and to reduce noise.

A further modification of the system can be seen in FIGS. 12 to 14. FIGS. 12 to 14 include a muffler system having incorporated therewith the cooling unit of the invention. Cooling of the gases therefore occurs within the muffler. In FIG. 12, a muffler 194 has an inlet 196, an outlet 198 and a housing 200 which defines a chamber 202. The housing 200 includes a plurality of pipes 204 passing therethrough, each pipe having a first end 206, a second end 208 and side walls 210 extending transversely, or at right angles, to the axis of the muffler, generally indicated by the reference numeral 212. The pipes 204 are arranged such that air can pass from the first end 206 through the pipe, and out through the second end 208. The side walls 210 of the pipes are inside the chamber 202 of the muffler 194, such that the emission gases passing through the muffler are cooled as they come into contact with the plurality of pipes 204 arranged in the muffler. A fan 214 is provided to drive air through the pipes, providing a radiator-type cooling system for gas emissions passing through the muffler. In this way, an initial cooling of the gases takes place and any condensate produced within the muffler may be appropriately removed. The muffler including the cooling unit shown in FIGS. 12 to 14 may further be used in conjunction with a further cooling unit of the type shown in FIG. 10. Additional condensate produced by the cooling gases would therefore result from the subsequent cooling, thereby enhancing the system's ability to effectively cool, condense and remove certain gases from the emissions.

Figure 15:
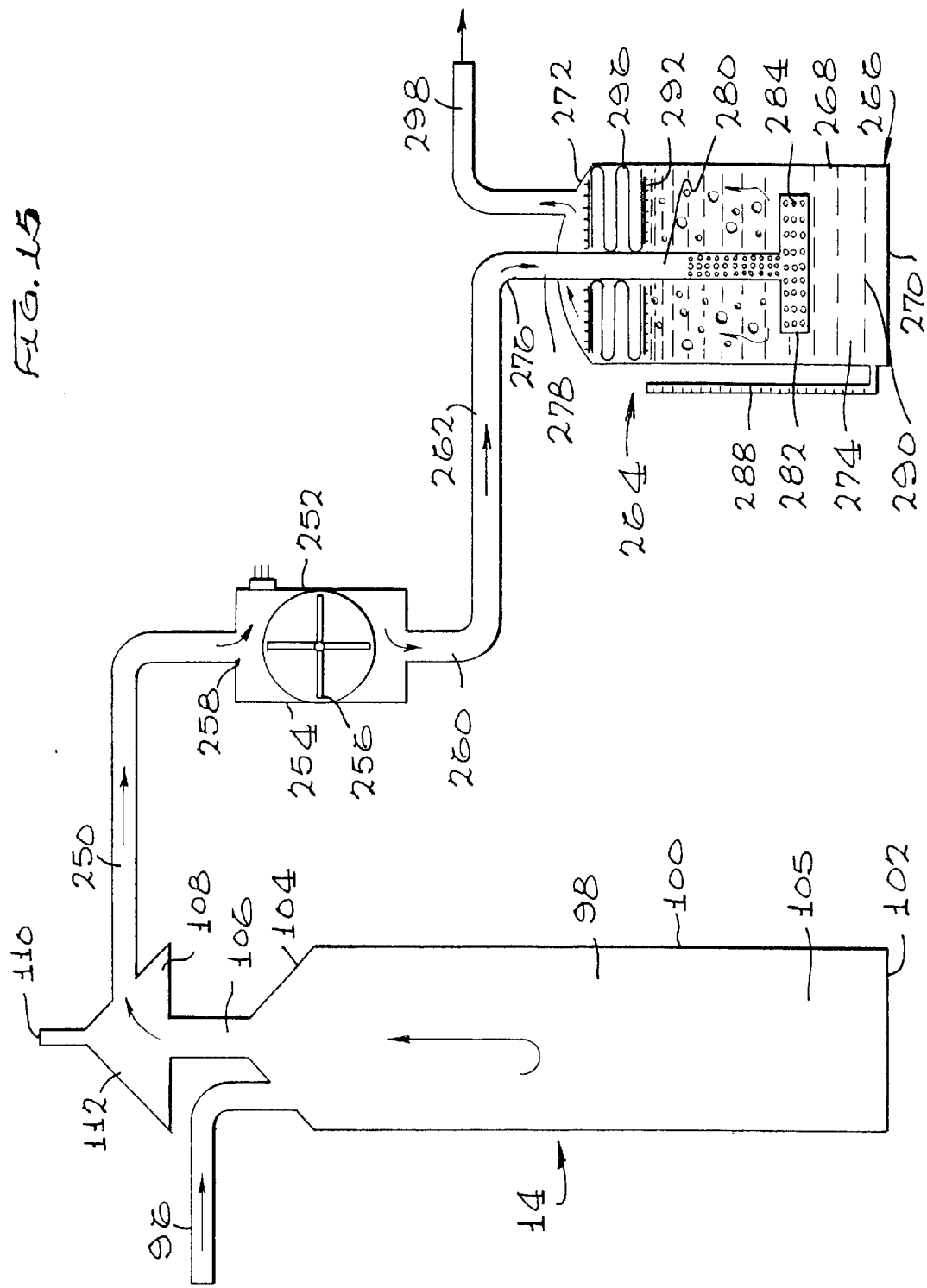
FIG. 15 is a schematic illustration showing another embodiment of the filtering system of the invention, including additional filtering means.

Reference is now made to FIG. 15 of the drawings, which shows a further embodiment of the invention, to provide additional filtering and separation of unwanted contents to further purify the air stream which is discharged from the system. FIG. 15 shows a filter unit 14, which could generally be of the type shown in FIG. 1 of the drawings. Thus, the filter unit 14 has a filter unit housing 98, comprising side wall 100, a housing floor 102, and a top wall 104, all of which define the filter chamber 105. The filter unit conduit 96 feeds the filter unit 14, as described. Once the air, with smoke, ash and other impurities have passed through the filter unit 14, it exits through the air exit tube 106, and may pass through a hood 108 and end 112 into the atmosphere. Alternatively, or optionally, the air exiting the air exit tube 106 may pass through various additional components to provide further filtration to thereby remove any remaining smoke, ash or other impurities within the air. In this embodiment, the discharge air from the filter unit 14 is fed through a conduit 250 to a fan/pump machine 252. The fan/pump machine 252 comprises a housing 254 including a fan 256, the housing 254 including an inlet 258 and an outlet 260. The air discharged from the filter unit 14 is sucked into the fan/pump machine 252 by a vacuum created by the operation of the fan 256, so that the discharge air travels along the conduit 250, and into the inlet 258 of the fan/pump machine 252. Thereafter, the fan/pump machine 252 discharges this exhaust mixture through the outlet 260, into a conduit 262, the conduit 262 conveying the exhaust mixture under pressure to a second filter unit 264.

The second filter unit 264 comprises a substantially cylindrical housing 266, having side walls 268, a base 270 and a top wall 272. The second filter unit 264 has a chamber 274 defined by the side wall 268, base 270 and top wall 272.

A T-shaped feed-pipe 276 is located within the chamber 274, the feed-pipe 276 having an external component 278 which connects to the conduit 262, in order to feed the exhaust mixture in the second filter unit 264. The feed pipe 276 further comprises a vertical component 280 and a horizontal component 282. A portion of the vertical component 280 and horizontal component 282 contains a plurality of apertures 284. The apertures 284 provide a means whereby the exhaust mixture can be discharged from the feed pipe 276 into the chamber 274.

Along the side wall of the chamber 274, there is provided a calibrated water gauge 288. The chamber 274 is filled with water 290 up to level 292, and the water gauge 288 provides a mechanism for determining the actual water level within the chamber 274. Above the water level 292, there is provided a solid filter 296, which may generally be comprised of sponge, foam or other material providing a barrier filter.

In the embodiment shown in FIG. 15, the exhaust mixture traveling through conduit 262 is introduced into the water 290 contained within the chamber 274 by exiting through apertures 284. The exhaust mixture so exiting bubbles or aspirates through the water, and at least some of the impurities which may be contained within the exhaust mixture entering the second filter unit 264 are removed, converted or otherwise processed by chemical or physical conversion to other forms, preferably non-toxic, and/or non-pollutant. The remaining air passes through the solid filter 296, where further filtration takes place, and thereafter is discharged, such as to the atmosphere, through an exit conduit 298.

The additional filtering unit shown in FIG. 15 provides yet a further mechanism whereby the impurities contained in the exhaust mixtures may be removed, for the purposes of providing a discharge through the exit conduit 298, which has even lower levels of impurities, thereby making it significantly more "environmentally friendly".

Figure 16:
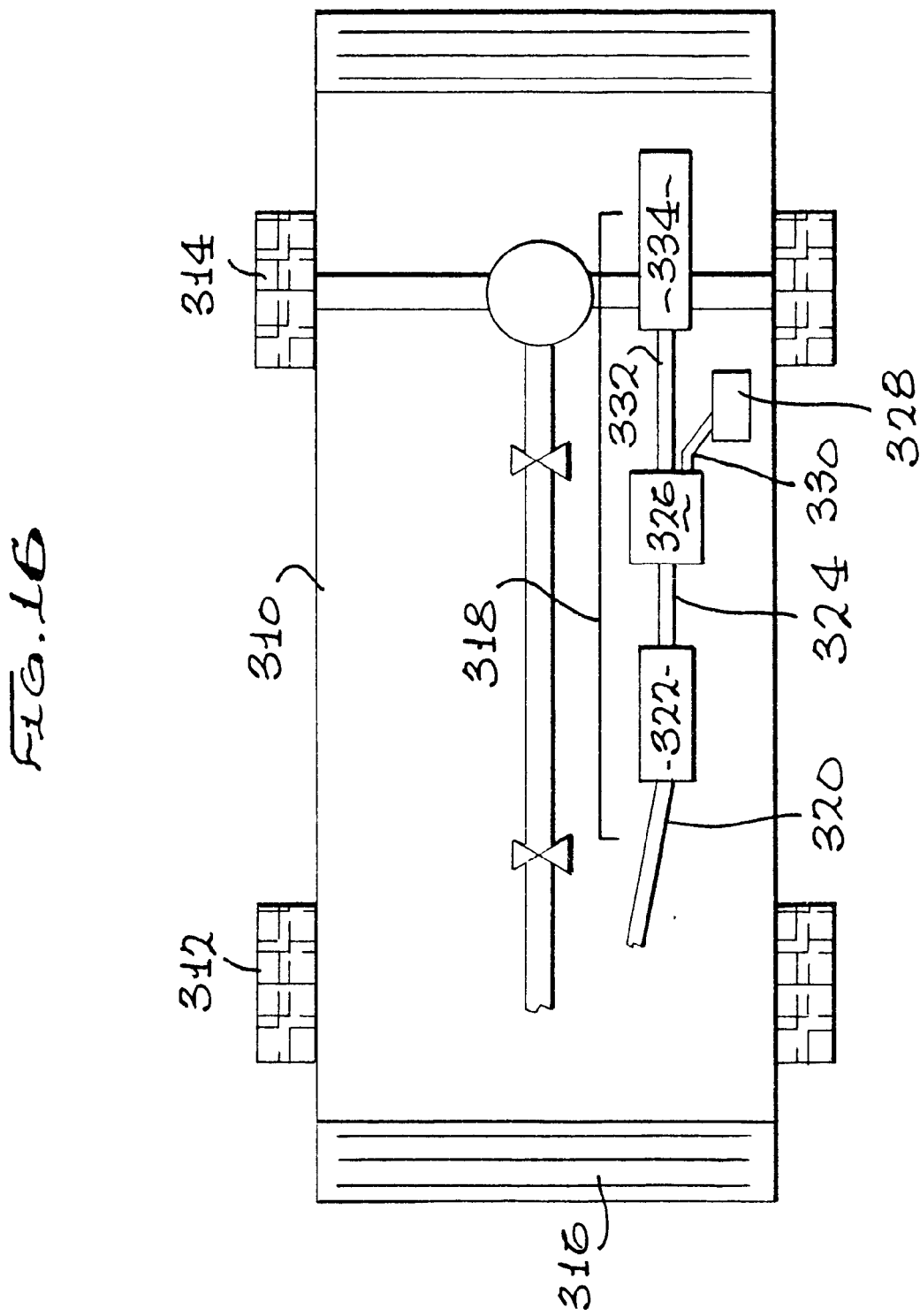
FIG. 16 is a schematic illustration of one embodiment of the invention for use with an internal combustion engine, showing its positioning and sequence relative to a vehicle.

Reference is now made to FIG. 16 of the drawings, which shows a filtration device and method of the invention when used in an application with an internal combustion engine of a vehicle. The system illustrated in FIG. 16 may have similar components to those diagrammatically illustrated in FIGS. 10 to 14 of the drawings, described above.

FIG. 16 shows, in schematic form, a vehicle 310 having front wheels 312, rear wheels 314, upon which is mounted a frame of chassis 316. The vehicle 310 is equipped with a filtering device of the invention, indicated generally by the reference numeral 318. The filtering device 318 includes an exhaust conduit 320 which receives hot exhaust gases from the internal combustion engine contained within the vehicle 310, but not specifically illustrated in the drawing. These exhaust gases are transmitted through the exhaust conduit 320 to the noise eliminator 322, and thereafter pass through conduit 324 to the cooler unit 326. The cooler unit has associated therewith the liquid container 328, fed by conduit 330, which receives the condensed impurities produced by the cooler unit 326.

The non-liquid mixture passes from the cooler unit 326 through conduit 332, to the ash compartment 334, which may comprises a series of filtering components, of various coarseness and specificity, so that the dry ash or solid components of the exhaust mixture is trapped within this filter.

Although not specifically shown in FIG. 16 of the drawings, the system may further comprise the second or supplemental filter unit, including a pump or fan, for further filtration of the exhaust mixture.

The embodiment shown in FIG. 16 illustrates how the filtering device of the invention is incorporated into a vehicle containing an internal combustion engine, indicating the exit pathway for the exhaust gases, and the various mechanisms by which the impurities contained within the exhaust mixture are removed, either as a liquid or solid component, so that the air-mixture exiting into the atmosphere from the vehicle 310 has been substantially purified and cleansed.

The invention is not limited to the precise details illustrated or described herein.

What is claimed is:

1. A filter device for removing combustion gases and/or particulate matter from air, the device comprising:

a cooling unit having an inlet tar receiving an air stream containing combustion gases and/or particulate matter, a cooling member tar lowering the temperature of the air stream, a first outlet for discharge of a condensate, and a second outlet for discharge of the air stream containing uncondensed particulate matter;

a first filtering unit having an inlet for receiving the air stream containing uncondensed particulate matter from the second outlet of the cooling unit, the filtering unit, having at least one filter barrier through which the air stream passes, the filter barrier being configured to catch at least a portion at the particulate matter in the air stream; and a second filtering unit having an inlet for receiving the air stream from the first filtering unit, the second filtering unit comprising a liquid through which the air stream is passed to reduce or eliminate a least a portion of the remaining particulate matter in the air stream.

2. A filter device as claimed in claim 1 wherein the cooling member comprises a plurality of pipes through which the airstream passes, and means for causing air to flow over the pipes.

3. A filter device as claimed in claim 2 wherein the means for causing air to flow over the pipes is a fan unit.

4. A filter device as claimed in claim 3 wherein the plurality of pipes are held together by at least an upper bracket located within the chamber.

5. A filter device as claimed in claim 1 further comprising a reservoir releasably attached to the first outlet of the cooling unit, the reservoir for storing condensate.

6. A filter device as claimed in claim 1 further comprising a delivery conduit to the cooling unit and driving means for forcing the air stream through the delivery conduit.

7. A Lifter device as claimed in claim 6 wherein the driving means comprises a tan in the delivery conduit.

8. A filter device as claimed in claim 1 wherein the filtering unit comprises a housing, an air stream inlet connectable to the filter barrier which is located within the housing, the housing further comprising an outlet aperture, wherein the filter barrier is located between the air stream inlet and the outlet aperture.

9. A filter device as claimed in claim 8 wherein the air stream inlet is connected to a cylindrical pipe within the housing, the pipe having a plurality of apertures to permit passage of air from inside of the pipe to the outside thereof, the filter barrier being located adjacent the pipe.

10. A tilter device as claimed in claim 8 wherein the filter barrier is located commercially about the cylindrical pipe.

11. A filter device as claimed in claim 1 wherein the filter barrier comprises a porous screen.

12. A filter device as claimed in claim 1 wherein the filter barrier comprises an inner porous screen and a cloth material screen located concentrically thereabout.

13. A filter device as claimed in claim 1 further comprising a combustion chamber for receiving and burning waste material, the combustion chamber producing she air stream containing combustion gases and/or particulate matter which is conveyed so the cooling unit.

14. A filter device for removing combustion gases and/or particulate matter from air emissions downstream of an internal combustion engine the device comprising: a muffler unit for receiving and processing an air stream containing combustion gases and/or particulate matter;

a cooling unit downstream of the muffler unit, the cooling unit having an inlet for receiving the air stream from the muffler unit a cooling member tar lowering the temperature of the air stream, a first outlet for discharge of a condensate, and a second outlet tar discharge of the air stream containing uncondensed particulate matter; and a filtering unit having an inlet for receiving the air stream containing uncondensed particulate matter from the second outlet at the cooling unit, the filtering unit having at least one filter barrier through which the air stream passes, the filter barrier being configured to catch at least a portion of the particulate matter in the air stream.

15. A filter device as claimed in claim 14 further comprising a muffler unit far cooling the air stream.

16. A filter device as claimed in claim 15 wherein the muffler unit comprises a plurality of pipes extending transversely therethrough, means far directing air flaw through the pipes whereby combustion gases and/or particulate matter within the muffler unit is cooled.

17. A process for removing combustion gases and/or particulate matter tram an air stream, the process comprising:

cooling the air stream in a cooling unit to produce a condensate component containing at least same condensed combustion gases and an uncondensed component containing at least some of the particulate matter;

discharging the condensate component from the cooling unit into a receptacle;

conveying the uncondensed component from the cooling unit to a filtering unit downstream thereof; and forcing the uncondensed component separately through a solid filter and a liquid to capture at bust some of the particulate matter therein.

18. A filter device as claimed in claim 1 wherein the second filtering unit comprises a housing defining a chamber, an inlet for introducing the air stream from the first filtering unit to the chamber of the second filtering unit, the chamber having a space for containing a liquid and into which the air stream is introduced, tile chamber further comprising a solid filter member above the space through which the air stream passes before discharge from the device, the liquid in the space and solid filter member further filtering impurities that may be in the air stream.

* * * * *